United States Patent [19]

Breslow

[11] 3,910,929
[45] Oct. 7, 1975

[54] POLYFUNCTIONAL QUATERNARY AMIDOXIMIDINIUM SALTS

[75] Inventor: David S. Breslow, Wilmington, Del.

[73] Assignee: Hercules Incorporated, Wilmington, Del.

[22] Filed: Jan. 29, 1974

[21] Appl. No.: 437,548

Related U.S. Application Data

[62] Division of Ser. No. 250,504, May 5, 1972.

[52] U.S. Cl.... 260/293.53; 260/246 B; 260/293.63; 260/326.85
[51] Int. Cl.² .................................... C07D 453/02
[58] Field of Search ...... 260/246 B, 293.53, 293.63, 260/326.85

[56] References Cited
UNITED STATES PATENTS
3,390,204  6/1968  Breslow .............................. 260/837

*Primary Examiner*—G. Thomas Todd
*Attorney, Agent, or Firm*—Marion C. Staves; John W. Whitson; Edwin H. Dafter, Jr.

[57] ABSTRACT

The invention relates to polyfunctional quaternary amidoximidinium salts. These salts are precursors to polyfunctional nitrile N-oxides and, as such, are useful in the modification of ethylenically unsaturated polymers. Representative of these salts is terephthalo-bis(-hydroximoyl pyridinium chloride).

3 Claims, No Drawings

POLYFUNCTIONAL QUATERNARY AMIDOXIMIDINIUM SALTS

This is a division of application Serial No. 250,504, filed May 5, 1972.

This invention relates to a new class of compounds which are polyfunctional nitrile N-oxide precursors. More particularly, this invention relates to polyfunctional quaternary amidoximidinium salts. The salts are useful as modifying agents in the modification of ethylenically unsaturated polymers.

Polyfunctional nitrile N-oxides and their polyfunctional hydroximoyl halide precursors are known. Reference may be made to U.S. Pat. No. 3,390,204 to Breslow. The nitrile N-oxides may be generated from the hydroximoyl halides either by the application of heat or by treatment with a stoichiometric amount of base. However, generation by the application of heat involves thermal decomposition of the hydroximoyl halide to the nitrile N-oxide and hydrogen halide, which is acidic and which can therefore have an undesirable effect on some polymeric materials, such as cellulose derivatives. In generating the nitrile N-oxide by means of a base, the base acts to remove hydrogen halide from the hydroximoyl halide precursor, but some basic materials also can have a degrading action on polymers containing functional groups such as ester groups.

Furthermore, since stoichiometric amounts of base are required to generate the nitrile N-oxides from their polyfunctional hydroximoyl halide precursors, the latter can not be effectively used in the cross-linking of unsaturated polymers in applications wherein only a small amount of base will be present at any one time. For example, in a graphic arts system, the base needed to form the polyfunctional nitrile N-oxide must be photochemically generated. Thus, the amount of base that is formed is limited by the light intensity. Another limitation to the polyfunctional nitrile N-oxide precursors previously known is that they generally are not water soluble and therefore cannot be effectively used in aqueous systems.

Now in accordance with this invention, there has been discovered a new class of polyfunctional nitrile N-oxide precursors which have high thermal stability and which can be converted into the corresponding polyfunctional nitrile N-oxides by contact with only catalytic amounts, rather than stoichiometric amounts, of basic materials. Furthermore, many of these precursors are water-soluble and, accordingly, are useful in aqueous systems. The polyfunctional compounds in accordance with this invention have the formula

wherein R is an organic radical having a valence greater than 1,

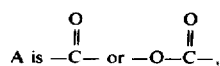

b is zero or 1, NR'R''R''' corresponds to a tertiary organic amine having a dissociation constant greater than $1 \times 10^{-12}$ as determined at 25°C., Z is chloride, bromide or iodide, n and m are 1 to 3, c and d are zero or 1, with c being 1 when d is zero, and with d being 1 when c is zero, and X is the anion of an acid having a dissociation constant greater than $1.0 \times 10^{-3}$ as determined at 25°C., the number of X's being equal to the number of NR'R''R''' 's when X is monovalent and being equal to one-half the number of NR'R''R''' 's when X is divalent. Representative of X are the chloride, bromide, iodide, nitrate, perchlorate, sulfate, trifluoroacetate, tosylate, methanesulfonate, benzenesulfonate, benzenedisulfonate and methosulfate anions.

Generally, R will be selected from the group consisting of the hydrocarbon, halide substituted hydrocarbon, hydrocarbonoxy-hydrocarbon, hydrocarbon-thiohydrocarbon and hydrocarbonsulfonyl-hydrocarbon polyvalent radicals. In preferred embodiments of this invention R is a divalent hydrocarbon radical selected from the group consisting of alkylene radicals such as, for example, ethylene, trimethylene, tetramethylene, pentamethylene, hexamethylene, octamethylene, decamethylene, dodecamethylene and octadecamethylene; arylene radicals such as o-, m- and p-phenylene, halogenated o-, m- and p-phenylene, biphenylene and naphthylene; cycloalkylene radicals such as cyclohexylene, cyclopentylene, cyclooctylene and cyclobutylene; arylene-dialkylene radicals such as o-, m- and p-xylylene and o-, m-, and p-phenylenediethylene; alkylene-diarylene radicals such as methylene-bis(o-, m- and p-phenylene) and ethylene-bis(o-, m- and p-phenylene); cycloalkylenedialkylene radicals such as 1,2-, 1,3- and 1,4-cyclohexane-dimethylene and 1,2- and 1,3-cyclopentane-dimethylene; alkyleneoxy-alkylene radicals such as ethyleneoxyethylene; arylene-oxyarylene radicals such as phenyleneoxyphenylene; alkarylene-oxyalkarylene radicals such as methylenephenyleneoxyphenylenemethylene; and the corresponding thio and sulfonyl radicals such as ethylenethioethylene, phenylenethiophenylene, phenylenemethylenethiomethylenephenylene, butylenesulfonylbutylene.

The compounds of this invention may be prepared by reaction of polyfunctional hydroximoyl halides of the formula

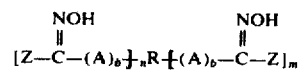

with tertiary amines of the formula NR'R''R'''. In these formulae, the designations are the same as in the formula given earlier for the compounds of this invention. The reaction generally is carried out at room temperature and in the presence of a solvent. The tertiary amine will have a dissociation constant greater than $1 \times 10^{-12}$ as determined at 25°C., since if the amine is not sufficiently basic the quaternary amidoximidinium salt will not be formed. The tertiary amine ordinarily will be used in an amount sufficient to displace all of the halogen, Z, in the hydroximoyl halide reactant. However, complete displacement depends upon the solvent used. In a solvent such as methanol, all of the halogen is displaced, but in a solvent such as tetrahydrofuran a product still containing halogen is obtained due to its insolubility in tetrahydrofuran. This product precipitates out of the reaction mixture, thus removing itself from further reaction with the tertiary amine.

The compounds of this invention may also be prepared from polyfunctional nitrile N-oxides of the formula

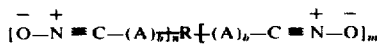

in cases where the nitrile N-oxides are sufficiently stable. Treatment of the polyfunctional nitrile N-oxide with tertiary amines of the formula NR'R''R''' followed by treatment with HX or H₂X produces the compounds of this invention. In these formulae, the designations are the same as in the formula given earlier for the compounds of this invention. The reaction generally is carried out at room temperature and in the presence of a solvent. In the case of nitrile N-oxides not possessing suitable stability at room temperature, it is desirable to use lower temperatures for the reaction.

The compounds of this invention, where b is 1, may also be prepared from polyfunctional ammonium salts of the formula $[(Z)_c(R'''R''R'N)_dC-H_2—A+_n—R+ACH_2NR'R''R''']_mX$ where the designations are as before. Treatment of these salts with nitrosating agents such as isopropyl nitrite, n-amyl nitrite or sodium nitrite and hydrochloric acid in a suitable solvent gives the desired products.

The tertiary amines used in preparing the compounds of this invention will contain at least three carbon atoms and may contain up to a total of forty carbon atoms. In these tertiary amines R', R'' and R''' may be monovalent hydrocarbon or substituted hydrocarbon groups, and these may be alkyl radicals, preferably containing one to twenty carbon atoms, such as, for example, methyl, ethyl, isopropyl, n-butyl, n-dodecyl and octadecyl; or cycloalkyl radicals such as cyclopentyl, cyclohexyl, cyclooctyl and cyclododecyl. One, but only one, of R', R'' and R''' may be a substituent containing an aromatic ring or a related ring such as furyl. The aromatic substituents may be aryl radicals, preferably having 1 to 3 rings, such as phenyl, biphenyl, naphthyl and anthryl; substituted aryl radicals, wherein the substituent may be halogen, alkoxy, nitro, cyano carboalkoxy, such as in the chlorophenyl, methoxyphenyl, nitrophenyl and cyanophenyl radicals; alkaryl radicals, preferably having 1 or more alkyl groups containing 1 to 20 carbon atoms and having 1 to 3 rings in the aryl groups, such as, for example, tolyl and octadecylnaphthyl; and similar aralkyl radicals such as benzyl and naphthylhexamethylene. Specific examples of suitable tertiary organic amines are trimethylamine, triethylamine, tri-n-propylamine, tri-n-butylamine, N,N-dimethylaniline, N-ethyl-N-methylaniline, benzyldibutylamine, N-benzyl-N-butylaniline, N,N-diethyl-N-(2-furyl)amine and N-(2-ethoxyethyl)-N-propyl-4-methoxyaniline.

Any two of the R substituents in the tertiary organic amine may be combined in the form of a cyclic structure such as that existing in pyrrolidine, piperidine and morpholine. Representative tertiary amines containing these structures are N-phenylpyrrolidine, N-butylpiperidine, and N-benzylmorpholine. Additionally, all three of the R substituents may be combined in a cyclic structure such as that existing in quinuclidine and 3-hydroxyquinuclidine. All three of the R substituents in the tertiary organic amine also may be combined to provide a heteroaromatic system. Representative of this type of tertiary amine are pyridine, substituted pyridines, such as 2,6-lutidine, 2-methylpyridine, 3-methylpyridine, 4-methylpyridine, 4-benzylpyridine, 4-methoxypyridine and 3-cyanopyridine, as well as benzopyridines and substituted derivatives thereof, such as quinoline, isoquinoline, 2-methylquinoline, 1-phenylisoquinoline, 4-methoxyquinoline, 5-methylisoquinoline, phenanthradine, acridine, 2-methylacridine and 3-methoxyacridine. These heteroaromatic amines are a preferred class of tertiary amines, since they provide quaternary amidoximidinium salts of this invention which are more stable than those provided by some of the other tertiary organic amines encompassed by the invention.

Representative of the compounds of this invention are the poly(hydroximoyl quaternary ammonium halides) and the polyfunctional carbonyl hydroximoyl quaternary ammonium halides and related salts, such as methylene-bis(glyoxylohydroximoyl pyridinium chloride), ethylene-bis(glyoxylohydroximoyl triisopropylammonium chloride), tetramethylene-bis(glyoxylohydroximoyl 2,6-lutidinium bromide), pentamethylene-bis(glyoxylohydroximoyl dimethylphenylammonium methanesulfonate), 1,2,3-propane-tris-(glyoxylohydroximoyl 2-methylpyridinium nitrate), 1,2,4-pentane-tris(glyoxylohydroximoyl methyldibenzylammonium bromide), 1,4-cyclohexane-bis(glyoxylohydroximoyl 4-benzylpyridinium perchlorate), p-phenylene-bis(acetohydroximoyl benzylidibutylammonium chloride), 2,2'-thiabis(acetohydroximoyl 4-methoxypyridinium) sulfate, 3,3'-thiabis(propionohydroximoyl benzylbutylphenylammonium chloride), isophthalo-bis(hydroximoyl 3-cyanopyridinium iodide), terephthalobis(hydroximoyl pyridinium chloride), 4,4'-bis(benzohydroximoyl ethylmethylphenylammonium tosylate), 4,4'-methylene-bis(benzohydroximoyl quinolinium chloride), 4,4'-oxa-bis(benzohydroximoyl tri-n-butylammonium trifluoroacetate), 3,3'-thia-bis(benzohydroximoyl 2-methylquinolinium chloride), p-phenylene-bis-(glyoxylohydroximoyl isoquinolinium methosulfate), 4,4'-bis-(phenylglyoxylohydroximoyl phenanthradinium chloride), 4,4'-methylene-bis(phenylglyoxylohydroximoyl acridinium chloride), and the related quaternary ammonium derivatives of the ethylene glycol, tetramethylene glycol, 1,4-cyclohexylene glycol and resorcinol esters of chloroximinoglyoxylic acid.

As mentioned earlier, the compounds of this invention are precursors to polyfunctional nitrile N-oxides. Due to their comparatively high thermal stability, these precursors are only slowly converted to the corresponding nitrile N-oxides by exposure to elevated temperatures. Therefore, these precursors preferably are converted to the corresponding nitrile N-oxides by the action of an alkaline material which is reactive with HX or H₂X, where X is the acid anion shown in the structural formula for the compounds of this invention. The alkaline material acts by abstracting HX or H₂X from the precursor compounds of this invention, thus leading to conversion of the precursor compounds to the corresponding nitrile N-oxides. Only a catalytic amount of the added alkaline material is needed to effect the initial abstraction of HX or H₂X. This apparently results in the formation of an intermediate quaternary ammonium compound which is an inner salt. This intermediate then loses tertiary amine, thus providing additional alkaline material which acts to create more nitrile N-oxide.

These reactions may be illustrated by the following equations:

$$\left[ R-\overset{NOH}{\underset{\phantom{.}}{C}}---\overset{+}{N}R'R''R''' \right]_2 \cdot 2Cl^- + 2\ NaOH \xrightarrow{\text{(catalytic amount)}}$$

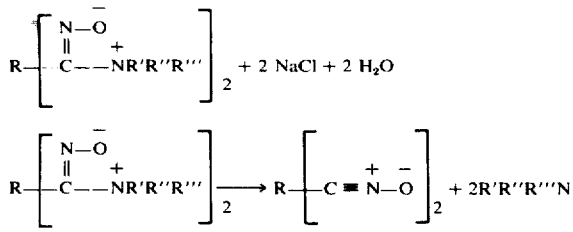

The tertiary amine formed in accordance with the last reaction then enters into the first reaction in place of sodium hydroxide as the alkaline material, and the reactions are repeated over and over with the liberated amine acting as the alkaline material.

Representative alkaline materials are the alkali metal and alkaline earth metal hydroxides, alkoxides, carbonates and salts of weak carboxylic acids, alkaline earth metal oxides, alkali metal fluorides, ammonia and organic amines. The alkyl group in the alkoxides normally will contain from one to twenty carbon atoms. Similarly, the carboxylic acids used in preparing the alkali metal and alkaline earth metal salts will contain from one to twenty carbon atoms. The organic amines may be primary, secondary or tertiary and generally will be characterized by a dissociation constant greater than $1.0 \times 10^{-12}$ as determined at 25°C. The more weakly basic amines, such as pyridine and aniline, are more effective at elevated temperatures, for example, 50° to 95°C., whereas the more strongly basic amines, such as triethylamine, are effective at room temperature. The amount of alkaline material used will be at least 0.1% by weight but, more generally will be from about 2 to about 5% by weight, preferably from about 5 to about 25% by weight based on the precursor compounds of this invention.

The polyfunctional nitrile N-oxides derived from the compounds of this invention may be used to effect modification of ethylenically unsaturated polymers. The extent of modification may be either low, resulting in some increase in molecular weight of the polymer, or high, in which case the polymer is crosslinked and, accordingly, insoluble in hydrocarbon solvents. Any polymer containing ethylenic unsaturation wherein there is at least one hydrogen radical attached to at least one of the carbon atoms of the ethylenic double bond can be modified utilizing the compounds of this invention. Among the polymers which can be modified in this manner are polybutadiene-1,2, polybutadiene 1,4, styrene—butadiene copolymers, isobutylene—isoprene copolymers, natural rubber, polyester resins, such as maleate- and fumarate-containing polyesters, butadiene—acrylonitrile copolymers, ethylene—propylene—dicyclopentadiene terpolymers, polychloroprene, polyisoprene, unsaturated polyurethanes, unsaturated alkyd resins such as tall oil alkyd resins, polyether copolymers and terpolymers containing at least two unsaturated epoxide constituents such as propylene oxide—allyl glycidyl ether copolymers and ethylene oxide—epichlorohydrin—allyl glycidyl ether terpolymers, unsaturated poly(vinyl alcohol) partial esters, unsaturated poly(vinyl alcohols) such as the allyl ethers of poly(vinyl alcohol), unsaturated cellulose esters and ethers such as allyl modified hydroxyethyl and hydroxypropyl celluloses, unsaturated poly(acrylamide) copolymers, unsaturated poly(carboxylic acid) esters, unsaturated sulfonic acid polymers and unsaturated poly(vinylpyrrolidone) copolymers, as well as appropriate blends of these polymers with each other. In addition to the olefinically unsaturated polymers, polymers containing acetylenic unsaturation can be used. In some cases it may be desirable to use partially hydrogenated products of the above unsaturated polymers.

The modification reaction is carried out by uniformly mixing the unsaturated polymer with a precursor compound of this invention and then preferably contacting the resulting mixture with an alkaline material. However, modification in the absence of alkaline material can be made to occur slowly by maintaining the admixture of unsaturated polymer and precursor compound at an elevated temperature. The amount of the precursor compound added will depend on the amount of modification desired. While from about 0.01 to about 50% by weight based on the polymer can be used, between about 0.1 and about 35% by weight based on the polymer is preferred. To effect cross-linking of the unsaturated polymer to an insoluble form, the amount of precursor compound normally will be from about 0.5 to about 35%, preferably from about 10 to about 25% by weight based on the polymer. The precursor compound is brought into uniform contact with the unsaturated polymer by blending or admixing the ingredients in any desired fashion. For example, they can be milled together in a conventional rubber mill. Also, the ingredients can be dissolved in a suitable solvent and then admixed with an alkaline material to initiate the modification reaction. Many of the compounds of this invention are particularly suitable for modifying polymers which are water-soluble, since these compounds have suitable solubility in water and also have high thermal stability in aqueous systems.

The rate of modification will depend somewhat on the temperature at which the unsaturated polymer, the precursor compound and the alkaline material are contacted. For any given composition the rate generally will increase with increasing temperatures, and satisfactory temperatures are those from about 20C. to about 150°C. Also, as already indicated in connection with use or organic amines as alkaline materials, weakly basic alkaline materials may require more elevated temperatures than strongly basic materials to obtain a desirable rate of modification. The same consideration is applicable with respect to the precursor compounds of this invention. Since the tertiary amine components of these compounds supply the additional alkaline material needed to create more nitrile N-oxide, after the reaction of the precursor compound with the added alkaline material has been initiated, the rate of modification will depend upon the effectiveness of the liberated tertiary amine as an alkaline material. For example, a precursor compound which is a pyridinium salt will give a better rate of modification if the reaction is carried out at a more elevated temperature, for example, 50° to 95°C.

In addition to the fundamental ingredients of the compositions which undergo the modification reaction, other additives can be incorporated. Typical additives are fillers such as carbon black, titanium dioxide, silica, diatomaceous earth and talc; plasticizers such as glycerin, propylene glycol, polyethylene glycols, phthalates, adipates, sebacates, fatty acid esters of pentaerythritol and fatty acid esters dipentaerythritol; stabilizers; adhesive promoters and pigments.

When the modification reaction is one of cross-linking, the cross-linked polymers are hard, tough resins which are substantially insoluble in water and hydrocarbon solvents. They exhibit improved tensile properties over their uncured counterparts. These polymers are useful in various applications such as protective and decorative coatings for various substrates, including wood, metals, paper and plastics, and as ingredients in tubing, pipes and other rubber articles. In the case of aqueous solutions of water-soluble polymers, application of the cross-linking technique results in the formation of stable gels.

The following examples will further illustrate the compounds of this invention and their use in the modification of unsaturated polymers. All parts and percentages are by weight unless otherwise noted.

EXAMPLE 1

To a solution of 2.02 parts terephthalo-bis(hydroximoyl chloride) (U.S. Pat. No. 3,390,204) in 198.0 parts of methanol was added 1.63 parts of pyridine. After stirring overnight, the clear solution was evaporated under reduced pressure until a white solid formed. This was collected by filtration, washed with methanol, and dried under vacuum to give 1.58 parts of white solid melting at 220°C. with decomposition. The analysis of this material was as follows: Carbon - 53.9%; Hydrogen - 4.27%; Nitrogen - 14.0%; Hydrolyzable Chlorine - 17.9%. Calculated for terephthalo-bis(hydroximoyl pyridinium chloride), $C_{18}H_{16}Cl_2N_4O_2$: Carbon - 55.3%; Hydrogen - 4.12%; Nitrogen - 14.3%; Chlorine - 18.1%.

EXAMPLE 2

To a solution of 2.01 parts of terephthalo-bis(hydroximoyl chloride) in 158.4 parts of methanol was added 1.97 parts of 2,6-lutidine. After 45 minutes, the solution was evaporated under reduced pressure to give an off-white solid which was washed with methanol. After drying, 0.94 part of material analyzing as follows was obtained: Carbon - 58.0%; Hydrogen - 5.18%; Nitrogen - 12.4%; Hydrolyzable Chlorine - 15.8%. Calculated values for terephthalo-bis(hydroximoyl 2,6-lutidinium chloride), $C_{22}H_{24}Cl_2N_4O_2$, are: Carbon - 59.1%; Hydrogen - 5.41%; Nitrogen - 12.5%; Chlorine - 15.8%.

EXAMPLE 3

To a solution of 142.0 parts of sodium iodide in 950.0 parts of acetone was added 100.0 parts of terephthalo-bis(hydroximoyl chloride) and the solution refluxed 30 minutes. The solid (NaCl) was separated by filtration and the filtrate evaporated under reduced pressure to give a yellow solid. This was washed several times with hexane. After two recrystallizations from acetonitrile there was obtained 36.0 parts of yellow solid having a melting point of 157° with decomposition and prior discoloration.

To a solution of 30.0 parts of this terephthalo-bis(hydroximoyl iodide) in 2376.0 parts of methanol was added 12.8 parts of pyridine. After stirring one hour, the solution was evaporated under reduced pressure until a yellow solid formed. This was collected by vacuum filtration and washed with methanol to give 30.0 parts of yellow solid. A sample recrystallized from methanol melted at 157–160°and analyzed as follows: Carbon - 37.2%; Hydrogen - 2.88%; Iodine - 44.5%; Nitrogen - 9.43%. The calculated values for terephthalo-bis(hydroximoyl pyridinium iodide), $C_{18}H_{16}I_2N_4O_2$, are: Carbon - 37.6%; Hydrogen - 2.81%; Iodine - 44.2%; Nitrogen - 9.76%.

EXAMPLE 4

To a solution of 10.0 parts of terephthalo-bis(hydroximoyl chloride) in 88.8 parts of tetrahydrofuran was added 9.8 parts of pyridine. After three days, the mixture was filtered to give 12.9 parts of a water-soluble, off-white solid. The material analyzed as follows: Carbon - 50.8%; Hydrogen - 3.67%; Chlorine - 20.8%; Nitrogen - 13.2%. The calculated values for terephthalomono(hydroximoyl chloride)-mono(hydroximoyl pyridinium chloride), $C_{13}H_{11}Cl_2N_3O_2$, are: Carbon - 50.0%; Hydrogen - 3.55%; Nitrogen - 13.5%; Chlorine - 22.7%.

EXAMPLE 5

To a solution of 20.0 parts of adipyl-bis(N-hydroxy formimidoyl bromide) (U.S. Pat. No. 3,390,204) in 200.0 parts of tetrahydrofuran was added 6.0 parts of 4-methylpyridine. After standing overnight, the solution was filtered to give an off-white solid which was washed with tetrahydrofuran. The analysis of this material was as follows: Nitrogen - 9.54%; Hydrolyzable Bromine - 34.7%. The calculated values for adipyl-mono(N-hydroxy formimidoyl 4-methylpyridinium bromide)-mono(N-hydroxy formimidoyl bromide), $C_{14}H_{17}N_3O_4Br_2$, are: Nitrogen - 9.33%; Bromine - 35.4%.

EXAMPLE 6

To a solution of 30.0 parts of the tetramethylene bis(ester) of oxalomonohydroximoyl chloride (U.S. Pat. No. 3,390,204) in 600.0 parts of ethyl acetate was added 26.0 parts of N,N-dimethylaniline in 100.0 parts of ethyl acetate. The pale solid which formed was isolated by filtration and washed with ethyl acetate. Recrystallization from ethyl acetate gave an off-white solid which analyzed as follows: Nitrogen - 10.2%; Hydrolyzable Chlorine - 13.4%. The calculated values for the tetramethylene bis(ester) of oxalomonohydroximoyl dimethylphenylammonium chloride, $C_{24}H_{32}N_4Cl_2O_6$, are: Nitrogen - 10.3%; Chlorine - 13.1%.

EXAMPLE 7

To a solution of 50.0 parts of 4,4'-bis(chloroacetyl)-diphenyl ether in 1000.0 parts of ethanol was added 42.0 parts of quinoline. The solution was stirred overnight before adding 3000.0 parts of ether to precipitate an off-white solid. This was recrystallized from ethanol-ether to give 4,4'-oxybis(phenacylquinolinium chloride). On analysis, it was found to contain 12.4% chlorine. Theory for $C_{34}H_{26}N_2O_3Cl_2$ is 12.2% chlorine.

Ten parts of this material was dissolved in 500.0 parts of ethanol and 6.6 parts of isoamyl nitrite added in small increments. The reaction mixture was allowed to stand overnight before adding 1500.0 parts of ether to precipitate a white solid. This was dissolved in ethanol and reprecipitated with ether to give 4,4'-oxybis(-phenylglyoxylohydroximoyl quinolinium chloride). On analysis, this was found to contain 11.3% chlorine and 8.52% nitrogen. Calculated values for $C_{34}H_{24}N_4O_5Cl_2$ are: Chlorine - 11.1%; Nitrogen - 8.76%.

EXAMPLE 8

To a solution of 15.0 parts of isophthalo-bis(nitrile N-oxide) [Bull. Chem. Soc. Japan, 38, 335 (1965)] in 500.0 parts of dioxane cooled to 0°C. was added 22.0 parts of 1-ethylpiperidine. Addition of 20.0 parts of sulfuric acid (specific gravity 1.83) in 100.0 parts of dioxane caused the formation of a white precipitate. This was isolated by filtration and dried to give material which analyzed as follows: Nitrogen - 12.0%; Sulfur - 6.39%. Calculated values for isophthalo-bis(hydroximoyl 1-ethylpiperidinium) sulfate, $C_{22}H_{36}N_4O_6S$, are: Nitrogen - 11.6%; Sulfur - 6.61%.

EXAMPLE 9

To a solution of 25.0 parts of 4,4'-bis(phenylglyoxylohydroximoyl chloride) (U.S. 3,504,017) in 500.0 parts of ethyl acetate was added 16.0 parts of quinuclidine in 80.0 parts of ethyl acetate. The light tan solid which formed was isolated by filtration. Recrystallization from a large volume of ethyl acetate gave an off-white solid which analyzed as follows: Nitrogen - 9.41%; Chlorine - 12.3%. The calculated values for 4,4'-bis(phenylglyoxylohydroximoyl quinuclidinium chloride), $C_{30}H_{36}N_4O_4Cl_2$, are: Nitrogen - 9.54%; Chlorine - 12.1%.

EXAMPLE 10

To a solution of 20.0 parts of terephthalo-bis(nitrile N-oxide) (U.S. 3,390,204) in 500.0 parts of dioxane was added 33.0 parts of isoquinoline. Addition of 29.0 parts of nitric acid (specific gravity 1.42) in 120.0 parts of dioxane caused the separation of an off-white solid. This was isolated by filtration and recrystallized from ethanol-ether to give material which analyzed as follows: Carbon - 56.9%; Hydrogen - 3.76%; Nitrogen - 15.2%. The calculated values for terephthalo-bis(hydroximoyl isoquinolinium nitrate), $C_{26}H_{20}N_6O_8$, are: Carbon - 57.4%; Hydrogen - 3.71%; Nitrogen - 14.9%.

EXAMPLE 11

A solution of 100.0 parts of Gelvatol 1-30 [Monsanto, poly(vinyl alcohol) of M. W. 14,000, from 100% hydrolysis of poly(vinyl acetate)] in 1890.0 parts of dried dimethylformamide was prepared by refluxing under nitrogen. To this solution at 100°–105°C. was added 8.9 parts of pyridine followed by the dropwise addition of a solution of 16.9 parts of 5-chlorocarboxynorbornene in 37.8 parts of dimethylformamide. The solution was cooled to 50°C. and precipitated by pouring into 4752.0 parts of acetone. A clear gel was isolated by filtration, dried under vacuum at 40°C. and reprecipitated by dissolving in 850 parts of hot water and pouring into 3168.0 parts of acetone. Seventythree and six-tenths parts of a water-soluble, white solid was collected by filtration. Hydrogen uptake of a sample of the solid was 0.11%.

EXAMPLE 12

To a solution of 15.0 parts of terephthalo-bis(hydroximoyl pyridinium chloride) prepared as in Example 1 and 100.0 parts of polymer prepared as in Example 11 in 1000.0 parts of water was added 6.94 parts of pyridine and the yellow solution heated at 90°C. Within 2 minutes the solution had gelled.

EXAMPLE 13

Example 12 was repeated substituting 17.0 parts of terephthalo-bis(hydroximoyl 2,6-lutidinium chloride) prepared in Example 2 as the modifying agent. Within 4 minutes at 90°C. the solution had become a stiff gel.

EXAMPLE 14

Example 12 was repeated using 22.0 parts of terephthalobis(hydroximoyl pyridinium iodide) prepared in Example 3 as the modifying agent. Within 10 minutes at 90°C. the solution had set to a stiff gel.

EXAMPLES 15–20

Further repetitions of Example 12 were carried out substituting the quaternary amidoximidinium salts prepared in Examples 5–10, in the amounts shown in Table I, for the terephthalobis(hydroximoyl pyridinium chloride) of Example 12. Also, alkaline materials other than the pyridine of Example 12 were used in most of the present examples. Table I summarizes these examples.

TABLE I

| Example | Modifying Agent | Base | Gelled Within |
|---|---|---|---|
| 15 | Adipyl-mono(N-hydroxy formimidoyl 4-methylpyridinium bromide)-mono(N-hydroxy formimidoyl bromide) 12 parts | $NaHCO_3$ 1.2 parts | 20 minutes |
| 16 | Tetramethylene bis(oxalomonohydroximoyl) dimethylphenylammonium chloride) 20 parts | $Na_2CO_3$ 1.7 parts | 14 minutes |
| 17 | 4,4'-oxybis(phenylglyoxylohydroximoyl) quinolinium chloride) 22 parts | Triethylamine 0.73 part | 45 minutes |
| 18 | Isophthalo-bis(hydroximoyl 1-ethylpiperidinium) sulfate 18 parts | $Na_2CO_3$ 0.6 part | 3 minutes |
| 19 | 4,4'-bis(phenylglyoxylohydroximoyl quinuclidinium chloride) 23 parts | Pyridine 0.54 part | 4 minutes |
| 20 | Terephthalo-bis(hydroximoyl isoquinolinium nitrate) 20 parts | Triethylamine 0.73 part | 12 minutes |

EXAMPLE 21

In a solution of 200 parts of Atlac 382E (Atlas, propoxylated bisphenol-A fumarate polyester resin of M.W. 3000) in 888.0 parts of tetrahydrofuran was suspended 71.0 parts of terephthalo-mono(hydroximoyl chloride)-mono(hydroximoyl pyridinium chloride) prepared as in Example 4. The dropwise addition of excess triethylamine at room temperature caused the formation of a stiff gel.

EXAMPLE 22

To a solution of 20.0 parts of an allyl-modified hydroxyethylcellulose (allyl D.S. = 0.15, hydroxyethyl M.S. = 2.67, M.W. = 750,000) in 4000.0 parts of water was added 0.1 part of terephthalo-bis(hydroximoyl pyridinium chloride) prepared as in Example 1 and 0.058 part of pyridine. Within five days at room temperature, the solution had formed a loose gel.

EXAMPLE 23

A solution of 50.0 parts polyethylene glycol compound 20-M (Union Carbide, product of reaction of polyethylene glycol of M.W. 6000 with a diepoxide, product M.W. 15,000 –20,000) and 0.25 part of p-methoxyphenol in 659.3 parts of benzene was prepared by heating. One third of the solvent was removed by distillation before 1.2 parts of pyridine was added. A solution of 2.36 parts of 5-chlorocarboxynorbornene in 44.0 parts of benzene was added dropwise, the solution refluxed 2 hours, and then allowed to stand 14 hours at room temperature. The solution was filtered before the polymer was precipitated into 1449.8 parts of hexane. The white solid was reprecipitated twice by dissolving in 439.5 parts of benzene and adding slowly to 1318.0 parts of hexane. The yield was 51.0 parts of a water-soluble, white solid having 0.05% hydrogen uptake (theory 0.06%).

To a solution of 100.0 parts of this polymer and 15.0 parts of terephthalo-bis(hydroximoyl pyridinium chloride) prepared as in Example 1 in 1000.0 parts of water was added 6.94 parts of pyridine and the yellow solution heated at 90°C. Within 2 ½ minutes the solution had become a stiff gel.

EXAMPLE 24

Nineteen parts of methanesulfonic acid silver salt was dissolved in a solution of 100.0 parts of polymer prepared as in Example 11 in 1000.0 parts of water. To this was added 15.0 parts of terephthalo-bis(hydroximoyl pyridinium chloride) prepared as in Example 1. The solution, which was milky due to precipitation of silver chloride, was heated two hours at 80°C. and allowed to stand overnight without gelling. The addition of excess pyridine gave a yellow color to the solution. On heating at 80°C., the solution gelled within 70 seconds.

EXAMPLE 25

Example 24 was repeated substituting 18.0 parts of trifluoroacetic acid silver salt for the methanesulfonic acid silver salt. After 2 hours and 15 minutes at 80°C., the solution had not gelled. Excess pyridine was added, and the solution gelled within 90 seconds at 80°C.

EXAMPLE 26

To a solution of 15.0 parts of terephthalo-bis(hydroximoyl pyridinium chloride) prepared as in Example 1 and 100.0 parts of polymer prepared as in Example 11 in 1000.0 parts of water was added 0.28 part of sodium fluoride. The solution was heated at 90°C. and gelled within 7 minutes.

EXAMPLE 27

Example 26 was repeated using 1.25 parts of sodium acetate in place of the sodium fluoride. On heating at 90°C., the solution gelled within 2 minutes.

EXAMPLE 28

Example 26 was repeated using 1.42 parts of aniline in place of the sodium fluoride. On heating at 90°C., the solution gelled within 6 minutes.

EXAMPLES 29–31

To compare the stability of bis(hydroximoyl chlorides) with their corresponding quaternary amidoximidinium salts in aqueous systems, the amounts of modifying agent shown in Table II were added to solutions of 100.0 parts of the polymer prepared as in Example 11 in 1000.0 parts of water. The clear solutions (a suspension was used in Example 29 due to the low water solubility of terephthalobis(hydroximoyl chloride) were heated to 90°C. and checked at intervals for gelation. In Example 31, where the thermal stability was such that after the period indicated at 90°C. no evidence of gelation was observed, 6.94 parts of pyridine was then added and the solution reheated to 90°C. unitl gelation occurred.

TABLE II

THERMAL STABILITY OF MODIFYING AGENTS AT 90°C. IN WATER

| Ex. | Modifying Agent | Time Required for Gelation |
|---|---|---|
| 29 | terephthalo-bis-(hydroximoyl chloride) 9 parts | 20 seconds |
| 30 | terephthalo-bis-(hyhroximoyl pyridinium chloride) 15 parts | 38 minutes |
| 31 | terephthalo-bis-(hydroximoyl 2,6-lutidinium chloride) 17 parts | >4 hours |

EXAMPLE 32—35

To illustrate the catalytic action of base in reacting with the nitrile N-oxide precursors of this invention, to solutions containing 100.0 parts of the polymer prepared as in Example 11 in 1000.0 parts of water were added the amounts of modifying agent shown in Table III, followed by the amounts of pyridine indicated. The yellow solutions were then heated at 90°C. and checked at intervals for evidence of gelation. The data from earlier examples, carried out in the same manner, are included in the table for the purposes of convenient reference.

TABLE III

CATALYTIC EFFECT OF BASE ON QUATERNARY AMIDOXIMIDINIUM SALTS

| Example | Modifying Agent | Parts Pyridine | Molar Ratio Modifying Agent: Pyridine:Polymer | Time Required for Gelation |
|---|---|---|---|---|
| 12 | terephthalo-bis(hydroximoyl pyridinium chloride) 15 parts | 6.94 | 5.7:13:1 | 2 minutes |
| 32 | terephthalo-bis(hydroximoyl pyridinium chloride) 15 parts | 1.27 | 5.7:2.4:1 | 2.5 minutes |
| 33 | terephthalo-bis(hydroximoyl pyridinium chloride) 15 parts | 0.54 | 5.7:1.0:1 | 6 minutes |
| 34 | terephthalo-bis(hydroximoyl pyridinium | 0.29 | 5.7:0.55:1 | 11 minutes |

TABLE III-continued

CATALYTIC EFFECT OF BASE ON QUATERNARY AMIDOXIMIDINIUM SALTS

| Example | Modifying Agent | Parts Pyridine | Molar Ratio Modifying Agent:Pyridine:Polymer | Time Required for Gelation |
|---|---|---|---|---|
| 30 | chloride) 15 parts terephthalo-bis(hydroximoyl pyridinium chloride) 15 parts | None | 5.7:0:1 | 38 minutes |
| 13 | terephthalo-bis(hydroximoyl-2,6-lutidinium chloride) 17 parts | 6.94 | 5.7:13:1 | 4 minutes |
| 35 | terephthalo-bis(hydroximoyl)-2,6-lutidinium chloride) 17 parts | 0.29 | 5.7:0.55:1 | 60 minutes |
| 31 | terephthalo-bis(hydroximoyl-2,6-lutidinium chloride) 17 parts | None | 5.7:0:1 | >4 hours |

What I claim and desire to protect by Letters Patent is:

1. A polyfunctional compound having the formula

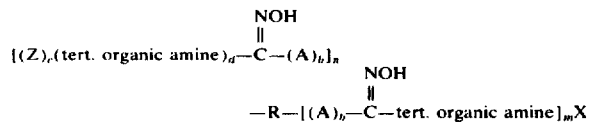

wherein R is an organic radical selected from the group consisting of hydrocarbon, halide substituted hydrocarbon, hydrocarbon-oxy-hydrocarbon, hydrocarbon-thio-hydrocarbon, and hydrocarbon-sulfonyl-hydrocarbon radicals, said hydrocarbon radical being selected from the group consisting of alkylene radicals containing 2–18 carbon atoms, arylene radicals containing 1–2 rings, cycloalkylene radicals containing 4–8 carbon atoms, arylene-dialkylene radicals containing 8–10 carbon atoms, alkylene-diarylene radicals containing 13–14 carbon atoms, and cycloalkylene-dialkylene radicals containing 7–8 carbon atoms,

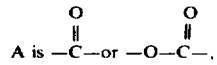

$b$ is zero or 1, tert. organic amine is selected from the group consisting of quinuclidine, 3-hydroxyquinuclidine and N-substituted pyrrolidines, piperidines and morpholines having a dissociation constant greater than $1 \times 10^{-12}$ as determined at 25°C., Z is chloride, bromide or iodide, $n$ and $m$ are 1 to 3, $c$ and $d$ are zero or 1, with $c$ being 1 when $d$ is zero, and with $d$ being 1 when $c$ is zero, and X is the anion of an acid having a dissociation constant greater than $1.0 \times 10^{-3}$ as determined at 25°C., the number of X's being equal to the number of tert. organic amines when X is monovalent and being equal to one-half the number of tert. organic amines when X is divalent.

2. Isophthalo-bis(hydroximoyl 1-ethylpiperidinium) sulfate.

3. 4,4'-Bis(phenylglyoxylohydroximoyl quinuclidinium chloride).

UNITED STATES PATENT AND TRADEMARK OFFICE
CERTIFICATE OF CORRECTION

PATENT NO. : 3,910,929
DATED : October 7, 1975
INVENTOR(S) : David S. Breslow (Case 61-68)

It is certified that error appears in the above-identified patent and that said Letters Patent are hereby corrected as shown below:

Column 5, line 36, " 5% by weight " should read -- 50% by weight --.

In Table 1, Examples 16 and 17 in the column entitled "Modifying Agent" remove -- ) -- at the end of the first line of each.

Signed and Sealed this sixth Day of January 1976

[SEAL]

Attest:

RUTH C. MASON
*Attesting Officer*

C. MARSHALL DANN
*Commissioner of Patents and Trademarks*